US010938668B1

(12) United States Patent
Zulak et al.

(10) Patent No.: US 10,938,668 B1
(45) Date of Patent: Mar. 2, 2021

(54) SAFE DEPLOYMENT USING VERSIONED HASH RINGS

(71) Applicant: Amazon Technologies, Inc., Seattle, WA (US)

(72) Inventors: Matthew Joseph Zulak, Seattle, WA (US); Marc John Brooker, Seattle, WA (US); Dylan Owen Marriner, Seattle, WA (US); Julian Embry Herwitz, Seattle, WA (US); Mauricio Roman, Seattle, WA (US); Guanghao Ding, Seattle, WA (US); Sanath Kumar Ramesh, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 116 days.

(21) Appl. No.: 15/283,192

(22) Filed: Sep. 30, 2016

(51) Int. Cl.
*H04L 12/24* (2006.01)
*H04L 29/08* (2006.01)
*G06F 9/48* (2006.01)
*H04L 12/803* (2013.01)

(52) U.S. Cl.
CPC .......... *H04L 41/20* (2013.01); *G06F 9/4881* (2013.01); *H04L 47/125* (2013.01); *H04L 67/327* (2013.01); *H04L 67/34* (2013.01)

(58) Field of Classification Search
CPC .............................. H04L 47/125; H04L 41/20
See application file for complete search history.

(56) References Cited

U.S. PATENT DOCUMENTS

| | | | |
|---|---|---|---|
| 7,757,236 B1* | 7/2010 | Singh | G06F 9/5083 709/224 |
| 9,152,458 B1* | 10/2015 | Hellerstein | G06F 9/4881 |
| 9,767,291 B2* | 9/2017 | Hoernecke | G06F 21/577 |
| 2004/0243709 A1* | 12/2004 | Kalyanavarathan | G06F 9/5033 709/226 |
| 2005/0198335 A1* | 9/2005 | Brown | H04L 67/1008 709/229 |
| 2006/0064478 A1* | 3/2006 | Sirkin | H04L 29/12066 709/223 |
| 2011/0213931 A1* | 9/2011 | Surtani | G06F 12/0866 711/119 |
| 2012/0155266 A1* | 6/2012 | Patel | H04L 47/125 370/235 |
| 2014/0310418 A1* | 10/2014 | Sorenson, III | H04L 67/288 709/226 |
| 2016/0142314 A1* | 5/2016 | Parsa | H04L 45/7453 370/235 |
| 2016/0350226 A1* | 12/2016 | Agarwal | G06F 12/0868 |

\* cited by examiner

*Primary Examiner* — Andrew C Georgandellis
(74) *Attorney, Agent, or Firm* — Davis Wright Tremaine LLP

(57) ABSTRACT

Computing resource service providers operate various services used to provide functionality to customers and other computing resources operated by various entities. These services may use consistent hash rings to direct a request to a particular worker. Previous versions of the consistent hash ring may be maintained such that predecessor information can be determined. When a request is received the request and predecessor information may be provided to a worker manager. The worker manager may utilize the predecessor information to obtain state information from a predecessor worker manager. The state information may then be used to process the request.

18 Claims, 8 Drawing Sheets

SAFE DEPLOYMENT USING VERSIONED HASH RINGS

BACKGROUND

Companies and individuals seeking to reduce the expense and overhead associated with maintaining their own computing resources have turned instead to purchasing remote computing services, such as remote program execution over multiple virtual machine instances and remote data storage, offered by computing resource service providers to customers. Such remote computing services are often configurable and scalable to meet various computing needs of the customers of the computing resource service provider.

In a large distributed computing system (e.g., multiple distributed data centers) of a computing resource service provider, various customers, users, services, and resources of the computing resource service provider are in frequent communication with each other. Balancing customer access to the computing resources and keeping the system secure becomes more challenging as the complexity and usage of the system increases. In such distributed computing systems, it can be difficult to isolate and troubleshoot issues within the system, and even when issues are identified, reliably distributing the resources of the system may be challenging. Furthermore, software on these distributed computing systems may occasionally need to be updated, changed, or otherwise modified. Along with modifying or updating software, the computing resources in these environments may be replaced, new hardware may be added, or the configuration of the computing resources may be modified. These changes to the distributed computing systems may pose a variety of problems to computing resource service providers.

BRIEF DESCRIPTION OF THE DRAWINGS

Various techniques will be described with reference to the drawings, in which.

DETAILED DESCRIPTION

Figure 1:
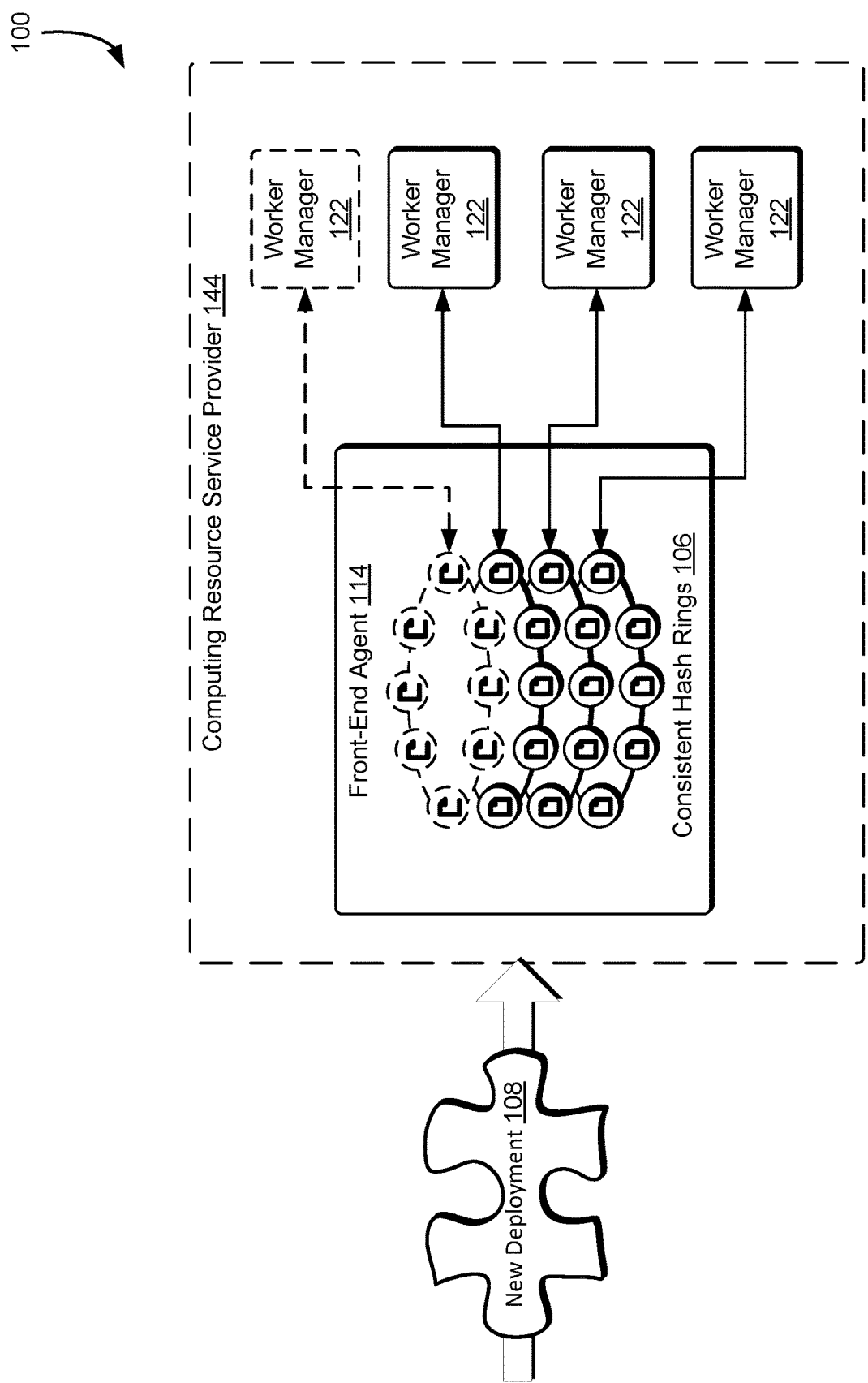
FIG. 1 illustrates an environment in which a versioned consistent hash ring may be used by a service front-end to facilitate activities of a worker manager in accordance with an embodiment.

In various examples described below, customer requests for computing resources provided by a computing resource service provider may be serviced using a consistent hash ring. The customer requests include various requests that may be routed or otherwise directed to one or more worker computer systems ("workers"). These workers include a variety of computing resources, including software, hardware, and a combination thereof, that processes or otherwise fulfils the customer requests. For each customer that submits a request, information associated with the request (e.g., a customer identifier) is hashed to determine a position on the consistent hash ring, and particular services and/or computing resources are associated with portions of the hash ring. In some examples, a service front-end selects the closest service end-point and/or computing resource to the hash's (e.g., the hash of the customer identifier discussed above) position on the consistent hash ring to handle the request. In order to prevent the loss of in-flight customer data (e.g., requests waiting or in the process of being fulfilled) or the loss of other state information, services and/or computing resources, described in greater detail below, are provided a mechanism for locating a predecessor (e.g., software containers or container agents responsible for processing the particular customer's request) and requesting that all state information be handed off from the predecessor to the new entity.

A front-end service or component thereof, such as a front-end agent, provides customers with access to the service endpoints (e.g., computing resources responsible for processing customer requests). In addition, the front-end service maintains a stack of immutable consistent hash rings used to route customer requests to particular service endpoints. A consistent hash ring is considered to be immutable when the positions or ranges within the consistent hash ring are fixed such that the hash of a value will always point to the same position or range every time the value is hashed (e.g., the same customer's request will always point to the same position on the consistent hash ring based at least in part on a hash of the customer identification number). When there is a change to the host topology (e.g., software deployments, refilling a pool of software containers, replacing failed software containers, hardware deployments, etc.), a new consistent hash ring associated with the change to the host topology is created and pushed onto the top of the stack of consistent hash rings. A previous version of the consistent hash ring (e.g., a version not at the top of the stack) may be retrieved to determine which computing resource was previously responsible for handling a particular customer's requests.

When receiving a customer request, a new worker manager or other computing resource responsible for managing and/or directing requests to the appropriate service endpoint will be informed by the service front-end or other entity transmitting the request to the new worker manager of an associated predecessor responsible for handling the particular customer's request in the previous version of the consistent hash ring. In response to a request from the new worker manager, the predecessor will cause a transfer of any requisite state information from the predecessor to the worker manager. In some embodiments, transferring the requisite state information may include transferring ownership and/or control of the service endpoint (e.g., computing resources responsible for processing the particular customer's requests) from the predecessor worker manager to the new worker manager. The new worker manager will then handle any unprocessed or incomplete customer requests. Once the predecessor worker manager has provided or offered the state information, the predecessor worker manager will remove the state information from internal storage, ensuring that the new worker manager has exclusive use of the state information it received from the predecessor.

In various implementations, these techniques reduce the impact on customers as a result of changes in system topology such as deployments. In addition, maintaining the versioned consistent hash ring enables simpler rollback to previous software containers and container agents. They also reduce customer latency when providing customer requests. Upon receiving a customer request to perform a particular operation, a front-end service may determine, according to a placement scheme and/or the consistent hash ring, which computing resources are to be used to process the request. In some cases, the computing resource service provider provides a multi-tenant front-end service for determining where to perform certain operations, and in some cases the computing resource service provider may allow customers to provide and configure their own front-end service to customize how the front-end service operates. Customers may want different behaviors for different services. For example, a customer may want a computer service to maintain multiple levels of predecessor information to better trace application execution but may want a storage service to track only the more recent predecessor information to enable simpler storage of customer data.

In the preceding and following description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

FIG. 1 illustrates an environment 100 in which versioned consistent hash rings 106 are used by a front-end agent 114 of a computing resource service provider 144 to manage and facilitate activities of a worker manager 122 in accordance with an embodiment. The versioned consistent hash rings 106 map customer requests to particular service endpoints managed by the worker managers. As described in greater detail below, the service endpoints include computing resources, such as software containers, used to process customer requests. Information associated with the customer such as location, customer identification number, name, alias, e-mail address, or any other customer data may be hashed using one or more hash functions. This may provide a unique identifier which may be used to associate and/or determine a particular service endpoint and/or computing resource used to fulfill a customer's requests.

The front-end agent 114, described in greater detail below, may receive requests from customers and other computer systems operated by the computing resource service provider 144. The front-end agent 114 may be a service and/or subsystem of various services offered by the computing resource service provider 144, such as an service or other service of the computing resource service provider 144 (described in greater detail in connection with FIG. 5) which provides and manages software containers to customers.

As described in greater detail below, the computing resource service provider 144 may operate host computer systems organized into one or more data centers. The host computer systems may provide computing resources to execute various entities, such as the front-end agent 104, service endpoints, and worker managers 122. The service endpoints may include one or more computing resources (e.g., physical computing resources, virtual computing resources, and/or distributed computing resources) that implement a service accessible via a network address associated with the service. Note that the service endpoints could comprise multiple devices (e.g., a combination of physical or virtual devices), such as when the network address corresponds to a load balancer that routes traffic to a plurality of redundant servers.

The services provided by the computing resource service provider 144 may include a virtual computer system service, a block-level data storage service, a cryptography service, an on-demand data storage service, a notification service, an authentication system, a policy management service, a task service, and one or more other services. It is noted that not all embodiments described include the services described above, and additional services may be provided in addition to or as an alternative to services explicitly described. Furthermore, the computing resources of the various services may communicate with other computing resources of the computing resource service provider 144, customers, or other services through a network whereby the network may be a communication network, such as the Internet, an intranet or an Internet service provider (ISP) network.

Returning to FIG. 1, when the front-end agent 114 receives a request for computing resources or a request to execute a task, the front-end agent 114 may determine a particular worker manager to process the request based at least in part on the versioned consistent hash rings 106. The particular worker manager may be selected based at least in part on a range within the versioned consistent hash rings 106 a particular attribute of the request hashes to. For example, an MD5 hash algorithm may be used to hash a unique customer identification number included in the request, and the resulting hash key may be within a particular range associated with a particular service endpoint which causes the front-end agent 114 to direct the request to the particular worker manager. The particular worker manager may be responsible for fulfilling the customer request by causing one or more workers (e.g., service endpoints and/or computing resources) to execute one or more operations to fulfil the request. The versioned consistent hash rings 106 may be maintained in a stack or other data structure such that the previous versions of the consistent hash rings 106 may be associated with the latest version of the consistent hash ring. In various embodiments, the front-end agent 114 maintains only two versioned consistent hash rings 106 to enable the front-end agent 114 to associate the consistent hash rings with the previous version.

In addition, the front-end agent 114 may then transmit the request to the worker manager 122 or may transmit a request (such as an appropriately configured application program interface (API)) to reserve or otherwise make available the worker manager 122 to process the request. The worker manager 122 will then either reserve or otherwise obtain computing resources or, if there is insufficient free capacity available (e.g., no unused or free software containers), obtain a new computing resource such as from a pool or collection of computing resources. In various embodiments, the versioned consistent hash rings 106 are periodically or aperiodically updated. The versioned consistent hash rings 106 may be updated by the front-end agent 114, the front-end agent 114 may query or otherwise request membership information from a worker manager back-end described in greater detail below in connection with FIG. 3. The versioned consistent hash rings 106 may be updated based at least in part on a set of worker managers managed by the worker manager back-end. For example, failed and/or failing worker managers 122 may be removed from a set of worker managers by the worker manager back-end. Failed and/or failing worker managers 122 may be determined based at least in part on various health checks performed by the worker manager back-end.

In various embodiments, the worker managers 122 do not share state, data, software containers, or other computing resources. The worker managers 122 are mapped to versioned consistent hash rings 106 which, as described above, may be used to distribute customers and/or customer requests between computing resources managed by the worker managers 122. In various embodiments, there are multiple worker managers 122 servicing multiple customers. Each individual worker manager may manage software, physical hardware, and other resource allocation in memory. In some embodiments, the worker managers 122 do not persist or store outside of memory the in-memory information associated with the resources managed by the worker managers 122. For example, an in-memory table of software containers managed by a particular worker manager will not be persisted and, therefore, would not be available after a new deployment 108 causes a restart of the worker manager or restart of a physical host executing the worker manager.

In various embodiments, the new deployment 108 replaces or updates worker managers 122 with new or updated computing resources. This may occur, for example, to update software associated with the computing resources or worker managers 122. Each new deployment (e.g., software update) may replace a set of worker managers, which may generate a new versioned consistent hash ring (both the new worker manager and new versioned consistent hash ring are illustrated by dashed lines in FIG. 1). In some embodiments, computing resources associated with old/predecessor worker managers are returned to the pool of computing resources, and requests directed to the old/predecessor worker managers are redistributed to other worker managers indicated in the versioned consistent hash rings 106. This may include the new worker managers associated with new computing resources.

Figure 2:
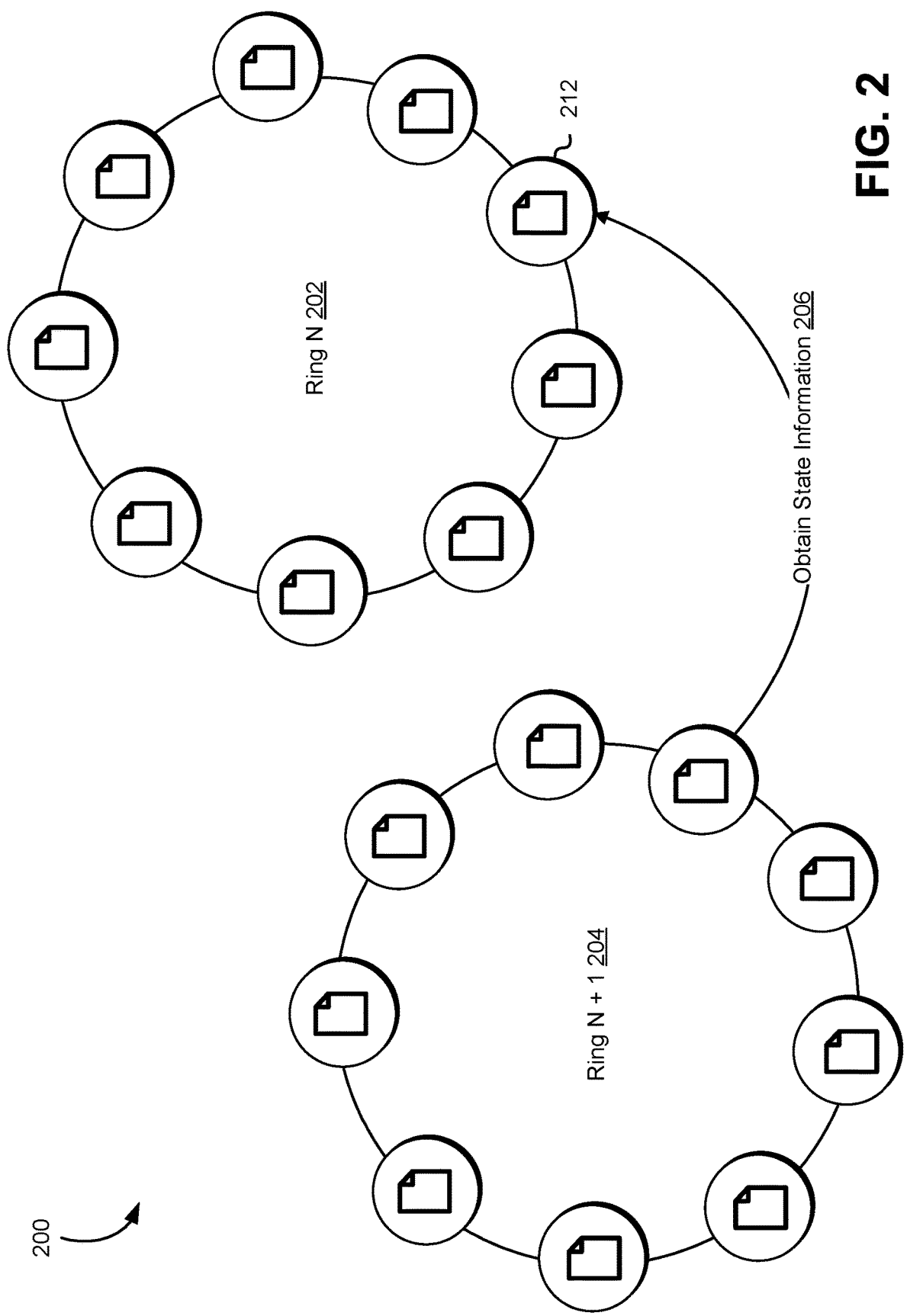
FIG. 2 illustrates an environment in which a versioned consistent hash ring may be used by worker managers to obtain state information in accordance with an embodiment.

FIG. 2 illustrates an environment 200 in which a consistent hash ring is used to process requests in accordance with an embodiment. As described above, a front-end service or other component, subsystem, or service may maintain consistent hash rings to determine a particular physical host or other computing resource to process a particular customer request. Two consistent hash rings are shown in FIG. 2 for the purpose of illustration and explanation, but any number of consistent hash rings may be used in accordance with the present disclosure. A first consistent hash ring is labeled "Ring N" 202. Ring N 202 represents a predecessor or previous consistent hash ring used to distribute customer requests.

Each member of the Ring N 202 represents a computing resource (e.g., software container, virtual machine instance, or other worker) which may be used to process and/or fulfil requests. In addition, the computing resources that are members of the Ring N 202 may be executing a task definition, software, or other executable instructions on behalf of the customer. In addition, FIG. 2 illustrates "Ring N+1" 204 which represents a new consistent hash ring associated with a set of new computing resources. The set of new computing resources may include a variety of computing resources as described above which are being added to the set of computing resources used to process and/or fulfill customer requests. For example, the set of new computing resources can include a set of software containers of a container instance executed by a physical host which is being added to a fleet of container instances used to process requests. In yet other embodiments, the set of new computing resources simply includes existing computing resources which have been updated by a software deployment.

As described above, a front-end service or component thereof, such as a front-end agent, is responsible for maintaining the stack of consistent hash rings. For example, the front-end service may generate the consistent hash rings and provide the consistent hash rings to the worker managers for request processing purposes. In some embodiments, a worker manager back-end may detect topology changes to the set of computing resources used to fulfill customer requests and generate the new consistent hash ring which is then provided to the front-end service. A topology change or other change to the computing resources used to process customer requests (e.g., software deployment to one or more hosts) may, as a results of being detected by the service front-end, cause the service front-end to create a new consistent hash ring and push it onto the top of a stack of consistent hash rings. The set of consistent hash rings may be maintained in a variety of data structures such as a list, ring, table, or other data structure suitable for maintaining versioned information. Furthermore, any previous version of a consistent hash ring (e.g., a consistent hash ring not on the top of the stack) may be retrieved to determine which worker manager was previously responsible for handling requests for a given customer.

When receiving a request from a front-end, a new worker manager (indicated in the new consistent hash ring) will be informed of a predecessor worker manager that was responsible for handling traffic based at least in part on a previous consistent hash ring version. If a new worker manager has no available capacity to reserve computing resources required to process the customer request, it may query the predecessor worker manager using a request to obtain state information 206. The request to obtain state information 206 may be an API call described in greater detail below. In some embodiments, the computing resources provided by the predecessor container agent will have sufficient free capacity for processing the request. However, if no such computing resource is available, a computing resource without sufficient capacity may be alternatively provided. For example, receiving a software container with insufficient capacity may result from a particular customer hitting a concurrency limit (e.g., a limit on a number of concurrent requests for software containers) and is therefore being throttled.

Once the predecessor worker manager has offered the computing resource to the new container agent as a result of the request to obtain state information 206, the predecessor worker manager may remove the computing resource from a set of computing resources available to the predecessor worker manager. This may ensure that the new worker manager has exclusive use of the computing resource and/or state information obtained. If the predecessor worker manager is unable to provide computing resources, the new worker manager may obtain computing resources from a set or pool of available computing resources. The computing resources obtained from the set or pool of available computing resources may have no associated state information. As illustrated in FIG. 2, the worker manager associated with Ring N+1 204 may attempt to obtain state information 206 from computing resource 212.

Using this process the new worker manager associated with Ring N+1 may obtain a sufficient amount of computing resources such that the new worker manager may direct customer requests to computing resources managed by the work manager to be processed. In some embodiments, the requests may be maintained in a queue until such time as that can be processed by the new worker manager and directed to computing resources for fulfillment. Furthermore, once the new worker manager has sufficient capacity to serve requests, the predecessor worker manager may be decommissioned (e.g., the computing resources used to execute the predecessor worker manager may be made available to perform other operations) and the previous version of the consistent hash ring may be deleted or removed as well. In addition, the container manager back-end or other system or service of the computing resource service provider may terminate or reallocate any computing resources associated with the predecessor worker manager that have not otherwise been allocated to other worker managers.

As an example, obtain state information function may be:

```
public class AdoptWorkerResponse {
    String az;
    String instanceId;
    String workerAddress;
    String customerId;
    int totalMemMb;
    int maxEnis;
    List<Eni> attachedEnis;
    List<Sandbox> idleSandboxes;
    List<Sandbox>busySandboxes;
}
    AdoptWorkerResponse adoptWorker(String idempotencyToken, Long currentRingVersion, InvokeConfig invokeConfig)
        throws InsufficientCapacityException;
```

The idempotency token illustrated above may be used to allow a worker manager to retry requests to obtain state information 206. The idempotency token may be a unique identifier, such as universally unique identifier (UUID), generated by the computer system which generated requests to obtain state information 206. Once the new worker manager and associated consistent hash ring is generated, the front-end service may attempt to discover the most recent hash ring (e.g., the consistent hash ring associated with the new worker manager) and direct requests and other traffic to the new worker manager. The front-end service may be queried for the last consistent hash ring version number(s) discovered, and the worker manager back-end may provide the front-end service with the most recent hash ring version number.

Once requests and other traffic are directed to the new worker manager, the new worker manager may attempt to obtain state information 206 from one or more predecessor worker managers. In various embodiments, a safety interval (e.g., one hour) is required to expire before one or more predecessor worker managers may be terminated. This process may also be used to scale up or otherwise increase computing capacity. In such scaling scenarios, the one or more predecessor worker managers are not terminated and are used to provide additional computing capacity.

Furthermore, because the consistent hash rings are immutable, rollback may be accomplished using the same mechanism. For example, a Ring N+2 may be created that is identical to Ring N 202, and the predecessor worker manager may then transmit the request to obtain state information 206 to the new worker manager. Failed worker managers and/or hosts executing the failed worker manager may be added to a blacklist and ignored in the consistent hash rings and will not cause the front-end service to generate new consistent hash rings associated with computing resources contained in the blacklist. The consistent hash rings may include metadata that indicated a version number of a particular consistent hash ring. When transmitting requests to a worker manager, the front-end service may include the highest known and/or latest consistent hash ring version number and a hash-key (e.g., a hash of customer identification information) used to determine the worker manager to process the request. The worker manager will use the information provided in the request to determine whether to obtain state information 206 from a particular predecessor worker manager.

As described above, requests to obtain state information 206 may be an API call enabling the new worker manager to obtain a software container or container instance from the particular predecessor container agent. The request to obtain state information 206 may transfer the current state of all computing resources associated with the particular predecessor worker manager at the time of the response to the request to obtain state information 206. The request to obtain state information 206 may ensure a consistent view of the state information at the time of the request by locking the computing resources or otherwise preventing modification or operation of the computing resources. In some embodiments, the worker manager receiving the state information must be a member of a consistent hash ring with a higher version than the worker manager providing the state information.

An example of the reserve computing resource may be:

```
def reserve_sandbox(ring_version, customer_id, invoke_config):
    if has_capacity(invoke_config):
        return reserve_sandbox_local(invoke_config)
    previous_worker_manager=get_worker_from_ring(ring_version-1, customer_id)
    if previous_worker_manager:
        adopt_succeeded=adopt_worker(previous_worker_manager, ring_version, idempotency_token, invoke_config)
    if adopt_succeeded:
    return reserve_sandbox_local(invoke_config)
    claim_worker_from_warming_pool(invoke_config)
    return reserve_sandbox_local(invoke_config)
```

When a computing resource and/or associated state information is adopted or otherwise provided to the new worker manager, some of computing resources may be busy (e.g., in the process of executing a function, task definition, or other executable code). The worker manager may then maintain a connection to the computing resource waiting to be informed that the computing resource is no longer busy. For example, one way of determining when a busy computing resource has become idle is to wait for an execution timeout, at which point the computing resource will be idle.

Figure 3:
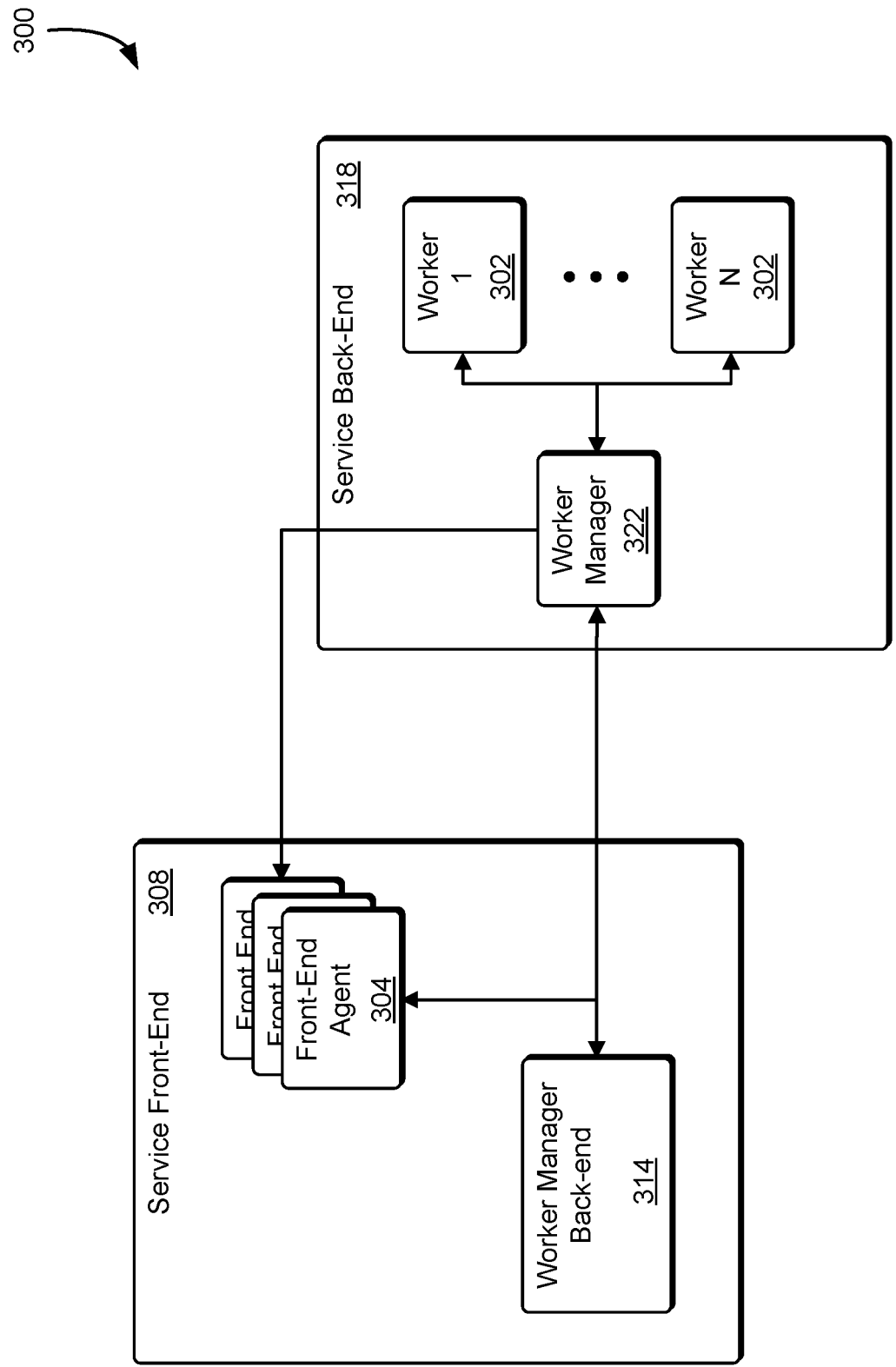
FIG. 3 illustrates an example of a service front-end distributing requests to a worker manager in accordance with an embodiment.

FIG. 3 illustrates an aspect of an environment 300 in which an embodiment may be practiced. As illustrated in FIG. 3, the environment 300 may include a set of workers 302 launched within a service back-end 318 being monitored by a worker manager 322. The worker manager 322 may communicate information to a service front-end 308 and a worker manager back-end 314. Customers of a computing resource service provider, communicating through the front-end agent 304, may submit requests to one or more workers 302 executed by host computer systems within the service back-end 318. The service back-end 318 may include a variety of physical and virtual computing resources organized into a logical grouping of computing resources used to provide computing resources to customers of the computing resource service provider. The workers 302 may be individual computing resources or logical grouping of computing resources within the service back-end 318. Examples of workers 302 include software containers, virtual machine instances, load balancers, storage instances, database instances, network appliances, or other computing resources used to process customer requests. The service front-end 308 may provide an interface for customers to provide requests. For example, one or more front-end agents 304 may receive customer requests and direct the customer requests to the worker manager 322 based at least in part on a consistent hash ring as described above.

In one example, a container encapsulation system operated by the service back-end 318 provided by or interfaced to the service front-end 308 may allow a customer to configure one or more applications within a container of an operating system which supports containers. The running processes and resources within the container may be isolated from other processes of the parent container instance and from the running processes and resources within other containers of the same host system. The customer may specify the amount of memory and processing capacity allocated to the container. The base container and the applications and data within it may then be packaged as an image, including one or more programs, data, and any system dependencies (e.g., libraries, files, etc.) that are needed for the programs to run on the operating system of the container instance. In some examples, an "image" may refer to an entire copy of a particular state of the base container at the time the image was generated. The image thereafter may be used to launch one or more identical containers, each of which may be assigned the specified amount of resources and may be isolated from each other. The containers may be launched on the same or different physical machines, and each container may be expected to run in exactly the same way as the base container. The containers described above are one example of the workers illustrated in FIG. 3 which may be managed by the worker manager 322.

In addition to the front-end agent 304 and the worker manager back-end 314, the service front-end 308 may include other services or computer systems not illustrated in FIG. 3 for simplicity, including a template service, a scheduling service, a router service, a telemetry service, and other services to process customer requests. Because the service front-end 308 may be configured as a multi-tenant service (i.e., the resources of the service front-end 308 may serve multiple customers concurrently), and because the services provided by the service front-end 308 exist outside and separate from the workers 302, the customers need not install individual software applications within their respective workers 302 to provide the functionality afforded by the services. The customers may utilize the functionality provided by these services by making web service application programming interface function calls through the front-end agent 304, which may be configured to receive requests from the customers and forward the requests to the appropriate service, such as the appropriate worker manager back-end 314 or worker managers 322.

The worker manager back-end 314 may also be configured to launch workers 302 and worker managers 322 within various environments, such as a virtual private cloud. In some embodiments, the workers 302 may be configured to communicate with other services of the computing resource service provider, such as block-level data storage services and/or on-demand data storage services. In some cases, workers 302 may be configured to share attached services with other workers 302. As an example, a worker associated with a customer may be mapped to a block-level storage volume of a block-level storage service of a computing resource service provider, and the other workers associated with the customer and/or worker manager 322 may each be configured to be able to read from and/or write to the block-level storage volume. In some examples, the block-level storage volume may be shared between multiple workers 302, such as all workers 302 managed by the worker manager 322.

The workers 302 may be running virtualization instances (also referred to as tasks) of varying lifespans (e.g., short-term batch jobs, long-term background processes, etc.) that have been isolated from other processes within the service back-end 318. Metrics about the workers 302 may be gathered, aggregated, and provided to the service front-end 308. The worker manager 322 acts as a go-between between the workers 302 and resources, services, and other entities outside the namespace of the workers 302. In some implementations, the workers 302 may be configured to share external resources, such as block-level data storage volumes. In some of these implementations, access to and communication with the shared external resources by the workers 302 may be made through the worker manager 322. In other implementations, the service back-end 318 or operating system of the workers 302 may support allowing the workers 302 to access or communicate with the shared resources without going through the worker manager 322.

In various embodiments, when the service back-end 318 is instantiated, its worker manager 322 updates the service front-end 308 with information indicating that the workers 302 are available for processing a request on behalf of a customer. For example, the service front-end 308, or component thereof such as the worker manager back-end 314, may generate a consistent hash ring as described above and provide the consistent hash ring to the front-end agent 304. Thereafter, if a request to launch a worker 302 or utilize a worker 302 to perform a task is received through the front-end agent 304 from the customer, the service front-end 308 may select the worker manager 322 to cause the worker 302 to fulfill the request based at least in part on the consistent hash ring. The consistent hash rings as described above may be used to associate and otherwise determine which worker 302 and/or worker manager 322 is to execute a particular customer task. In addition, a previous version of the consistent hash ring may be used to obtain state information and/or a worker 302 from another worker manager (e.g., the predecessor). If one of the workers 302 malfunctions and/or ceases operation, the worker manager 322 may reference the consistent hash ring to determine whether to re-launch the malfunctioning or inoperative worker 302 or to obtain additional workers 302 from a predecessor.

The worker manager 322 may be a software application that is executed by virtual computer instances operated by the computing resource service provider and may act as an interface between their respective service and other services and entities, such as the worker manager back-end services 314. For example, the worker manager 322 may act as intermediaries between the running tasks of their respective operating systems and other entities and services such that all communication to or from a worker 302 passes through the worker manager 322. In this manner, the worker manager 322 may be configured to interpret and translate commands between the workers 302 and computer systems running within the service front-end 308. This may allow changes to be made to the particular computing resources without requiring updates to be made to various tasks; e.g., only the worker manager 322 may need to be updated to reflect the changes to the particular computing resource.

As noted, the worker manager back-end 314 may be configured to provide an environment for other processes supporting the workers 302 and service back-end 318. The worker manager 322 may be configured to provide lifecycle and health information about the workers 302 being monitored by the worker manager 322 to the service front-end 308. In some embodiments, communication between the workers 302 and outside components may be a one-way communication from the worker manager 322 to the outside components. In other embodiments, communication between the worker manager 322 and the other components is bi-directional.

Figure 4:
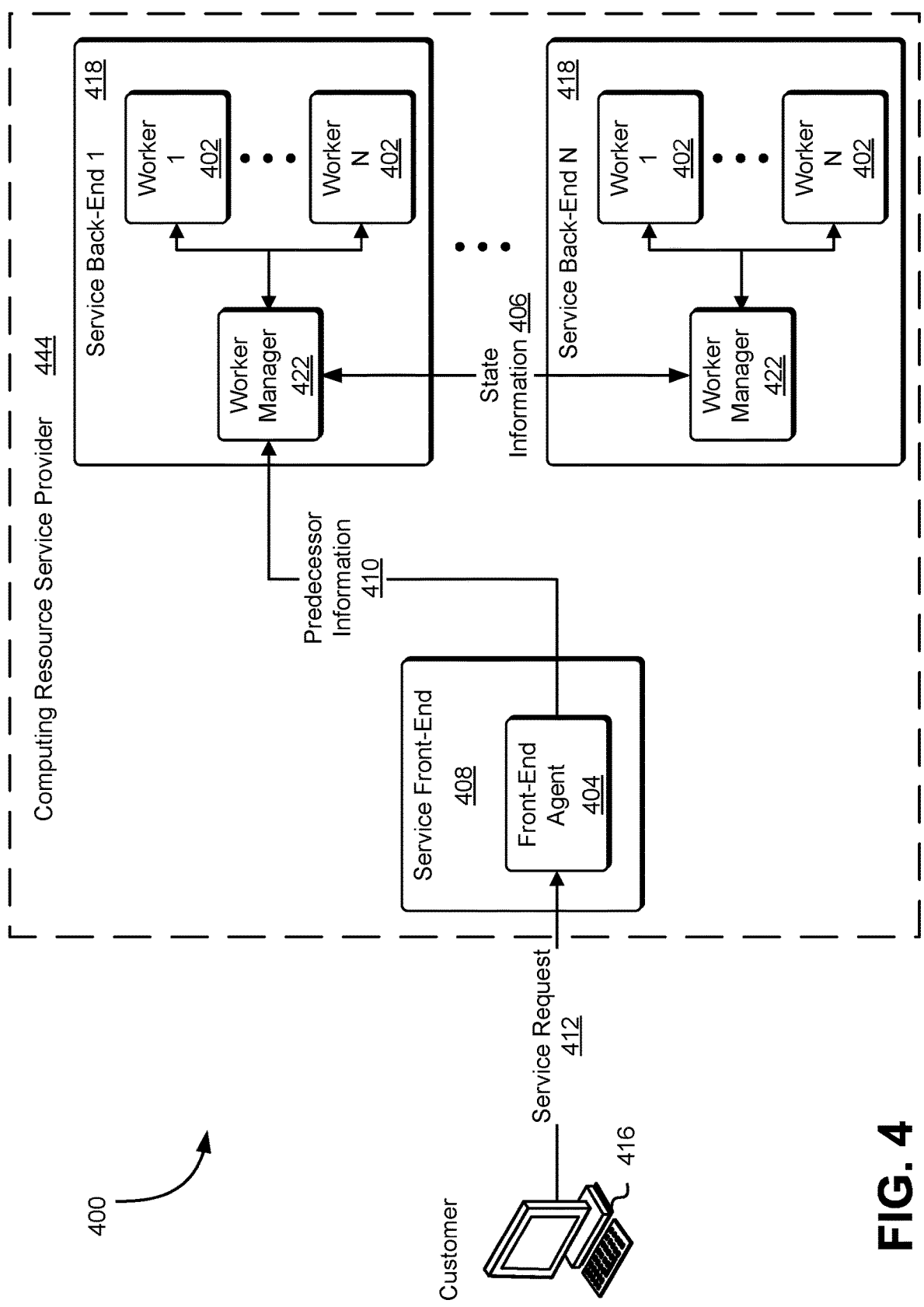
FIG. 4 illustrates an example of a service front-end providing predecessor information to a worker manager to enable the worker manager to obtain state information from a predecessor worker manager in accordance with an embodiment.

FIG. 4 illustrates an aspect of an environment 400 in which an embodiment may be practiced. As illustrated in FIG. 4, the environment 400 may include a set of workers 402 launched within one or more service back-ends 418 being monitored by a set of worker managers 422. The worker managers 422 may communicate information to a service front-end 408. A customer 416 of a computing resource service provider 444, communicating through the front-end agent 404, may submit service requests 412 to one or more workers 402 executed by host computer systems within a particular service back-end. The service back-end 418 may include a variety of physical and virtual computing resources organized into a logical grouping of computing resources used to provide computing resources to customers of the computing resource service provider 444.

The workers 402 may be individual computing resources or logical groupings of computing resources within the service back-end 418. Examples of workers 402 include software containers, virtual machine instances, load balancers, storage devices, databases, network appliances, or other computing resources used to process customer requests. The service front-end 408 may provide an interface for the customer 416 to provide service requests 412. For example, one or more front-end agents 404 may receive a service request 412 and direct the service request 412 to the worker manager 422 based at least in part on a consistent hash ring as described above.

The customer 416 may provide the service request 412 through one or more communications network such as the Internet, an intranet or an ISP network. In addition, the service request 412 may include information used by the front-end agent 404 to direct the service request 412 to a particular worker manager. For example, the front-end agent 404 may hash customer identification information included in the service request 412 and match the result to a range within the consistent hash ring, the range corresponding to a particular worker manager designated for processing and/or fulfilling the service request 412. The service requests 412 may include various types of requests (e.g., read requests, write requests, service requests, or other request types). Furthermore, the service requests 412 may include API calls as described above.

The front-end agent 404 may transmit the service request 412 to the worker manager 422 along with predecessor information 410. The predecessor information 410 may be generated based at least in part on a previous version of the consistent hash ring. The predecessor information 410 may include an identifier, network address, or other information which may be used by the worker manager 422 to obtain state information 406 from one or more other workers managed by another worker manager. As described above, the worker manager 422 may receive the service request 412 and determine if there is an available worker 402 to process the service request 412. A worker 402 may be available to process the service request 412 under a variety of different conditions, for example, if the worker has performed the same task in response to a previous service request. In another example, a worker 402 may be available if the worker 402 has sufficient state information to process the service request 412. In some embodiments, the state information may include an active software container used to execute a task definition provided by the customer as described in greater detail below.

If the worker manager 422 determines that a worker with the state information is not being managed by the worker manager 422 and is not available to process the service request 412, the worker manager 422 may determine if a worker with the state information is available based at least in part on the predecessor information 410. As described above, the worker manager 422 may transmit a request, such as a service call, including information associated with the service request 412, to determine if the predecessor worker manager manages a worker with the state information 406. If the worker with the state information is available, the predecessor worker manager may provide the worker and/or state information to the worker 402 to process the service request 412.

Figure 5:
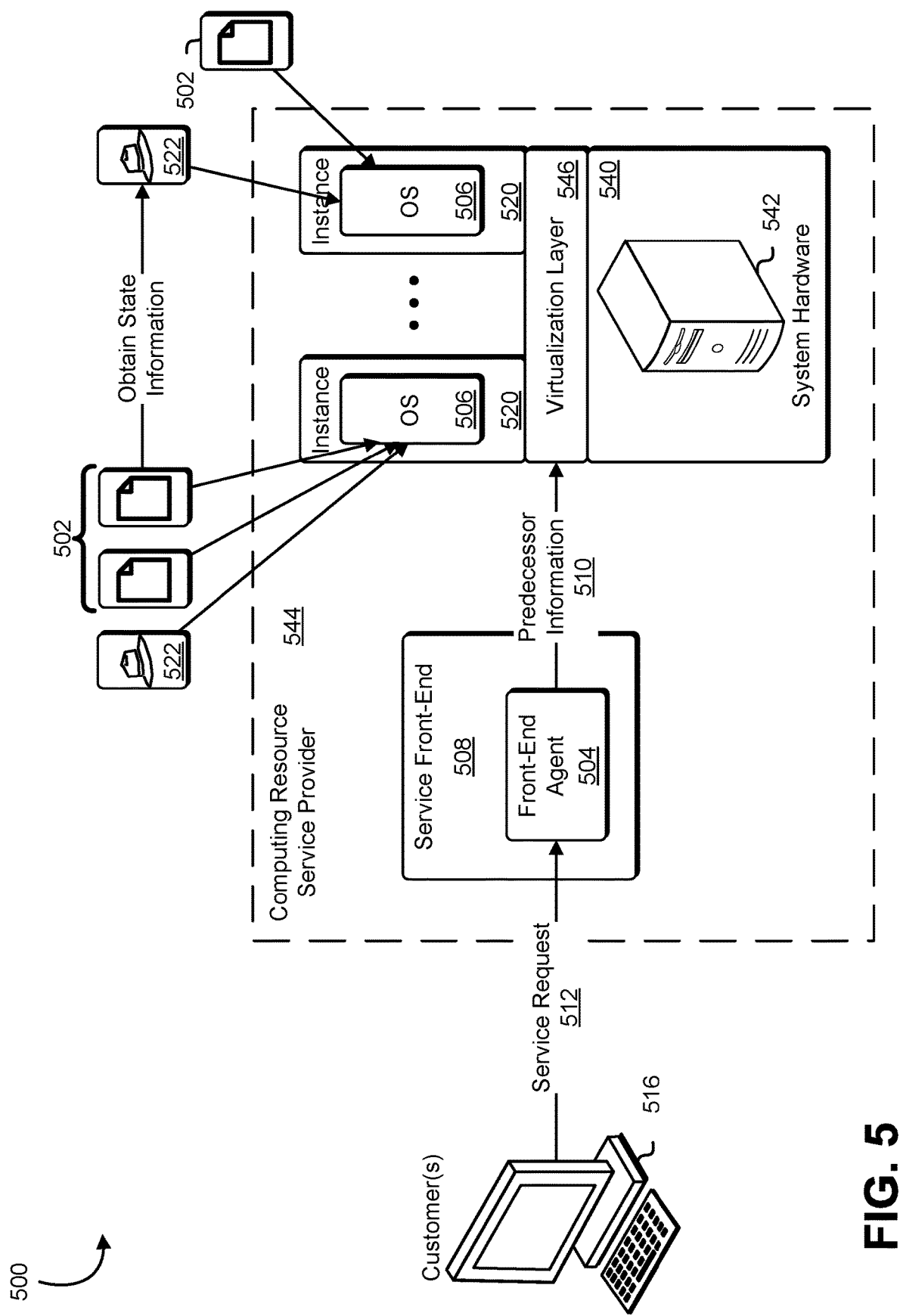
FIG. 5 illustrates an example of a service using consistent hash rings in accordance with an embodiment.

FIG. 5 illustrates an aspect of an environment 500 in which an embodiment may be practiced. Specifically, FIG. 5 depicts a service executing a plurality of virtual machines configured as container instances 520 in accordance with at least one embodiment. The service may provide system hardware 540 to customers 516 of a computing resource service provider 544 providing the service to perform computation services within workers 502. The system hardware 540 may include one or more hosts 542, also referred to as host computer systems. Each of the hosts 542 may be any device or equipment configured to execute instructions for performing data computation, manipulation, or storage tasks, such as a computer or a server. The hosts 542 may be equipped with any needed processing capability, including one or more processors such as a central processing unit, a graphics processing unit, or a digital signal processor. The hosts 542 may also be equipped with memory (e.g., static and dynamic memory), buses, and input and output ports that are compliant with any handshaking, communications or data transfer protocol. The system hardware 540 may also include storage devices, such as storage disks and tapes, and networking equipment. The storage devices may be network storage devices managed by a data storage service. As described above in connection with FIG. 4, a customer 516 may submit a service request 512 to a front-end agent 504 of a service front-end 508.

Virtualization layers 546 in the system hardware 540 enable the system hardware 540 to be used to provide computational resources upon which one or more container instances 520 may operate. The virtualization layer 546 may be any device, software, or firmware used for providing a virtual computing platform for the container instances 520. The virtualization layers 546 executing on the hosts 542 enable the set of system hardware 540 to be used to provide computational resources necessary to support the container instances 520. Furthermore, the physical host 542 may host multiple virtualization layers of the same or different types on the same system hardware 540. Each container instance 520 may include various virtual computer components such as one or more virtual processors, virtual memory, and virtual storage. The container instances 520 may be provided to the customers of the computing resource service provider 544, and the customers may run an operating system 506 and applications on each of the container instances 520. An example of a virtualization layer 546 includes a hypervisor.

The workers 502 may be virtual machine instances configured to support containerization, and the workers 502 may be used by various customers 516 as needed to fit the needs of the customer. Each worker 502 may be managed by a worker manager 522, which is an application configured to, when executed by one or more processors of a computer system, perform various tasks with workers 502 and the software container instances 520, including registering worker 502, deregistering worker 502, starting tasks, stopping tasks, providing task statuses, signaling task heartbeats, and reporting task events. Workers 502 may include data and one or more processes that, when executed in a computer system instance configured to support containerization, may be isolated from other processes running within the same computer system instance. In addition, a container manager back-end may be provided to determine a particular container instance or host to execute a customer request.

The workers 502 may be configured to run as tasks according to a task definition, and the task definition may be stored as a task definition file. The task definition file may describe one or more workers 502 that are assigned to start as a group. Software images of the workers 502, which may represent an entire copy of the particular state of the workers 502 at the time the software image was generated, that have been configured to execute within the workers 502, may be provided to the computing resource service provider 544 or their locations specified in the task definition. The task definition may also specify resource requirements, relationships between containers, network ports used, and shared resources, among other things.

Service requests 512 may be received by a front-end agent 504 such as the service front-end 508 of FIG. 5 operated by the computing resource service provider 544. The front-end agent 504 may direct the request to the appropriate worker manager 522. The front-end agent 504 may also transmit predecessor information 510, as described above, to the worker managers 522. Each container instance 520 may include one or more worker managers 522. The worker managers 522 may be configured to allow the customers 516 to manage their respective workers 502 and other computing resource. The worker managers may be further configured to perform logging of events and gather telemetry data related to the workers 502 and container instances 520.

The operating systems 506 may be any operating systems suitable for running within the container instances 520 and that provide isolation technology that enable containerization schemes to isolate virtualization instances, such as the workers 502, from other processes running under the operating system 506. Examples of such operating systems include various implementations of Linux® operating systems that support resource isolation features in the Linux® kernel. As noted, the workers 502 may be virtualized instances within the operating systems 506 launched from application images in accordance with one or more task definitions and may be allocated resources from their respective container instances 520.

Figure 6:
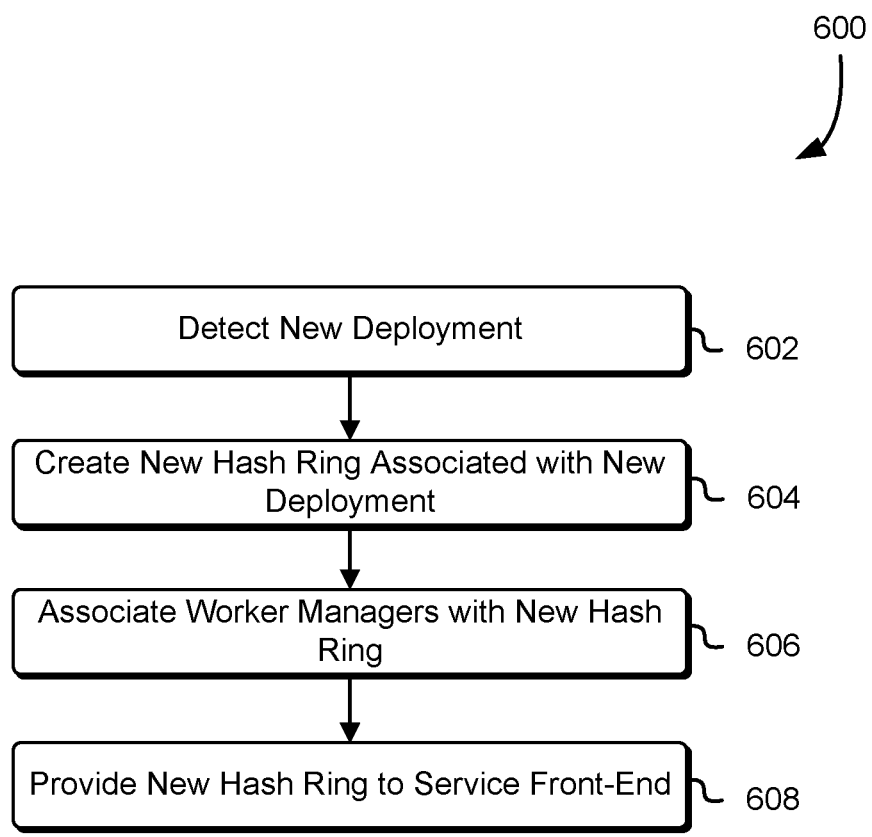
FIG. 6 shows an illustrative process which may be used to provide a versioned consistent hash ring to a container agent in accordance with an embodiment.

FIG. 6 is a block diagram illustrating an example of a process 600 for generating a consistent hash ring associated with a set of worker managers and/or workers in accordance with at least one embodiment. The process 600 may be performed by any suitable system such as a worker manager back-end, service front-end or other component of one or more services described above in connections with FIGS. 3-5. The process 600 includes detecting a new deployment 602. The new deployment may include any change to the computing resources of the one or more services as described above. For example, the addition or removal of a particular computing resource from a set of computing resources may be used to process customer requests. In another example, the new deployment may include a software deployment or software update provided to a particular computing resource used by the one or more services to process requests. The work manager back-end or other system performing the process 600 may detect the new deployment based at least in part on information obtained from a front-end service or other component of the one or more services as described above. For example, a particular service may include a deployment management system which is responsible for coordinating and updating other components of the particular service during new deployments.

In response to detecting the new deployment, the container manager back-end or other system performing the process 600 will then create 604 a new consistent hash ring associated with the new deployment. As described above, the consistent hash ring may be used to direct customer requests to a particular worker manager and/or worker responsible for fulfilling the customer request (e.g., execute a particular task indicated in the customer request). The new consistent hash ring may be generated based at least in part on customer identification information or other information included in service request. In addition, the new consistent hash ring may also be generated based at least in part on topology information, such as the location of the worker managers and/or workers within the computing resource service provider environment (e.g., the location of the physical hosts and networks supporting the container instances).

The container manager back-end or other system performing the process 600 may then associate 606 the worker managers with the new consistent hash ring. For example, the container manager back-end may provide the consistent hash ring to the service front-end so that the service front-end can direct customer requests to the work managers. As described above, worker managers may be mapped to particular portions of the consistent hash ring such that, when directing a service request, information in the service request is hashed to a particular portion of the consistent hash ring associated with one or more worker managers mapped to the particular portion. This enables the front-end service to direct customer requests to the appropriate worker managers and/or worker as indicated by the consistent hash ring. The new deployment may include the creation of worker managers and workers as described above. In such scenarios, the new consistent hash ring may be associated with the worker managers and used to route customer requests to the worker managers. As described above, the consistent hash ring may also be used to adopt or otherwise obtain state information and other computing resources from other worker managers based at least in part on other versions of the consistent hash ring. The container manager back-end or other system performing the process 600 may then provide 608 the new consistent hash ring to the service front-end. The service front-end may request the latest version of the consistent hash ring from the container manager back-end or other front-end services.

Figure 7:
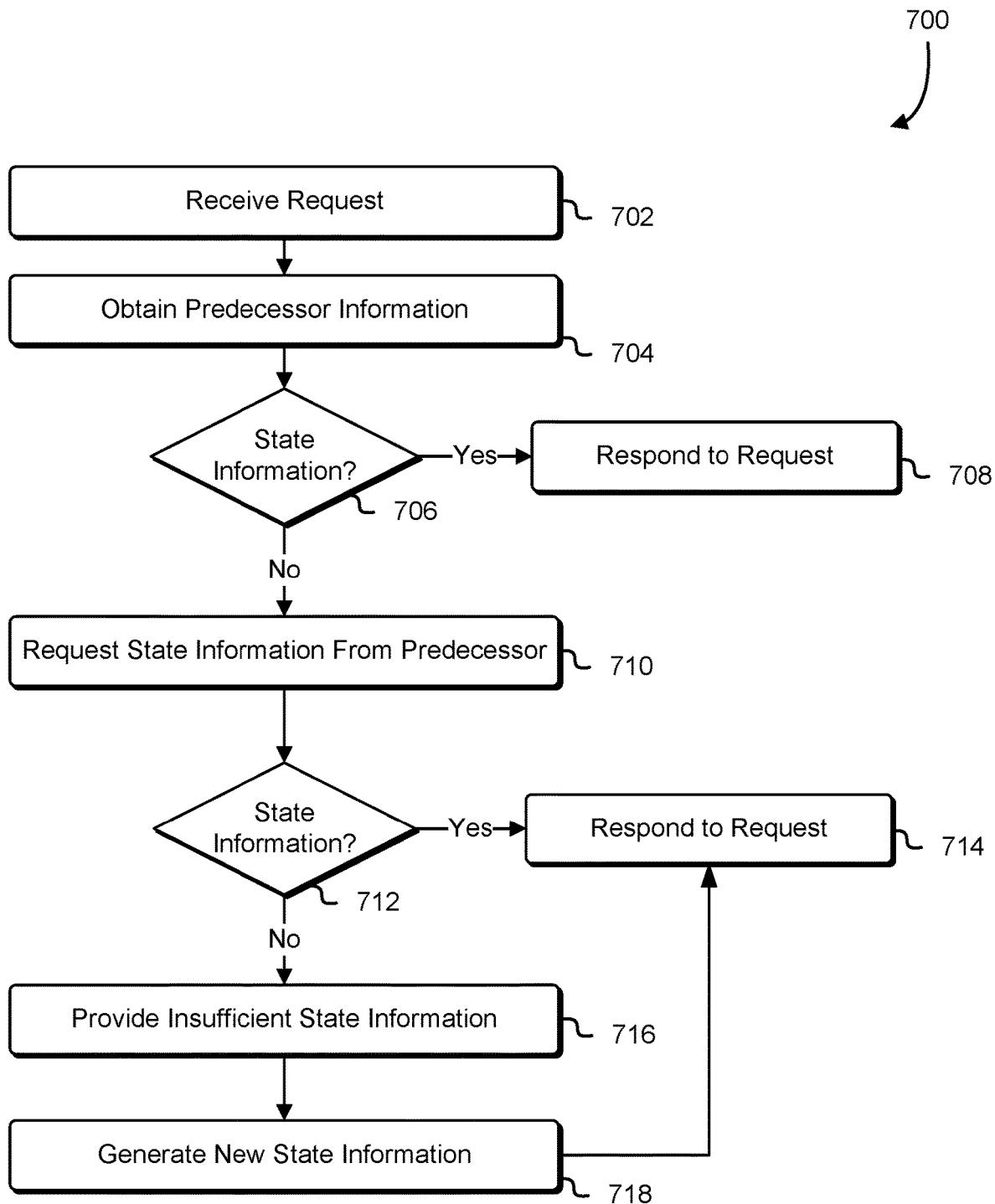
FIG. 7 shows an illustrative process which may be used to provide state information to a container agent in accordance with an embodiment.

FIG. 7 is a block diagram illustrating an example of a process 700 for fulfilling customer requests using workers managed by worker managers in accordance with at least one embodiment. The process 700 may be performed by any suitable system such as worker managers or other component of a service described above in connections with FIGS. 3-5. The process 700 includes receiving 702 a request. The request may be a customer request to execute a particular task as described above. Furthermore, the request may be directed to the worker manager based at least in part on a current version of the consistent hash ring. The system executing the process 700 may then obtain predecessor information 704. Predecessor information may be included in various versions of a consistent hash ring as described above. For example, the predecessor information may indicate a particular worker and/or worker manager responsible for fulfilling or otherwise handling a particular customer's request. The predecessor information (e.g., the various versions of the consistent hash ring) may be maintained by the service front-end or other component of the service as described above. The worker manager or other system executing the process 700 may then store the predecessor information for use in processing requests.

The requests may be distributed by the service front-end and may include, in some embodiments, predecessor information, customer information, task information, and any other information suitable for fulfilling the customer request. The worker manager or other system executing the process 700 may then determine if there is state information required to process the request. State information may include a worker and associated data available to process the request and underlying physical resources which are provided to the worker as described above. For example, state information requires not only that there be a worker available (e.g., not currently processing another request) but that the physical host executing the worker has sufficient physical resources (e.g., processor and memory) to satisfy the requirements of the request and/or software container. In another example, the state information requires that the worker has information suitable for processing the customer request, such as a worker that has previously processed a request from the customer to execute the same or similar task.

If there is the required state information 706, the worker manager may provide the state information (e.g., cause a worker with the state information to process the request) to respond to the request 708. Providing the state information includes causing the worker to execute the particular task indicated in the request and fulfill the request. If there is insufficient state information, the worker manager may attempt to obtain the state information from a predecessor 710. Obtaining state information from the predecessor may include adopting or otherwise obtaining access to a particular worker from a particular worker manager indicated in a previous version of the consistent hash ring, for example, using the obtain state information request as described above. The worker manager or other system executing the process 700 may then determine if the predecessor (e.g., another worker manager indicated as the predecessor in the previous version of the consistent hash ring) has sufficient state information 712. State information may include worker, physical resources, and other computing resources as described above.

If the predecessor has sufficient state information, the worker manager may obtain the state information using the adopt state information request as described above. Once the state information is obtained, the worker manager may then provide the state information to respond to the request 714. This may include executing a particular task indicated in the request as described above. If there is insufficient state information, the worker manager may provide insufficient state information 716. This may include providing a worker without the required state information (e.g., a worker that has not previously processed the task on behalf of the customer). In addition, providing insufficient state information may include queueing or otherwise delaying processing of the request. Finally, providing insufficient state information may also include obtaining the insufficient state information from the predecessor. For example, a software container with insufficient state information may be obtained from the predecessor using the adopt state information request as described above.

The worker manager or other system executing the process 700 may then generate new state information 718. Generating new state information may include a variety of operations that require and/or generate state information during the processing of the request. This may include updating various components of the service, for example, indicating a particular worker and/or worker managers are no longer associated with the predecessor or are being taken from a pool. Generating the new state information may also include indicating that the particular worker is now associated with a new worker manager. In numerous variations of the process 700, the process 700 may be performed to migrate or otherwise provide state information associated with a customer request to a new worker manager. Other operations may include instantiating computing resources to perform a task associated with the request or storing a request of processing at least a portion of the request.

Figure 8:
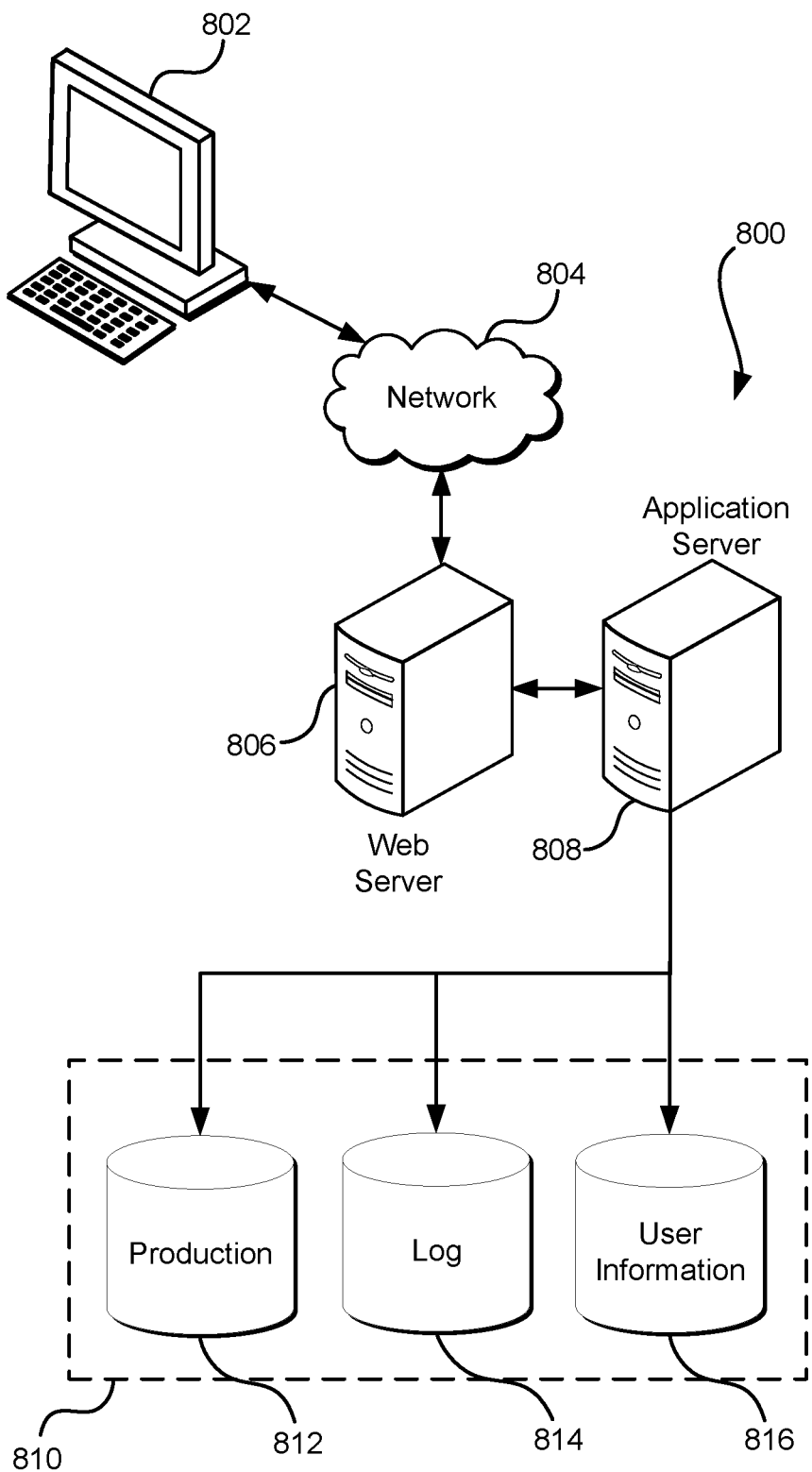
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages, or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 802 and the application server 808, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java °, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C"

refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    detecting a deployment to a first set of worker managers responsible for managing a first set of workers, the first set of workers performing operations to complete tasks included in one or more requests;
    generating a consistent hash ring based at least in part on the deployment, the consistent hash ring mapping the first set of worker managers to hash keys generated based at least in part on one or more attributes included in a set of requests;
    identifying at least one previous consistent hash ring of one or more previous versions of the consistent hash ring based at least in part on generating the consistent hash ring;
    associating the consistent hash ring with the previous consistent hash ring, the previous consistent hash ring associated with a second set of worker managers;
    obtaining a request to perform an operation at a service front-end;
    determining a worker manager of the first set of worker managers associated with the request based at least in part on the consistent hash ring, the worker manager managing a set of workers to perform one or more tasks indicated in the request;
    determining information associated with a predecessor worker manager of the second set of worker managers based at least in part on the previous consistent hash ring of the one or more previous versions of the consistent hash ring;
    providing the request and the information associated with the predecessor worker manager to the worker manager to enable processing of the request;
    determining there is insufficient state information to process the request;
    providing a request for state information to the predecessor worker manager based at least in part on the information associated with the predecessor worker manager;
    based on the request for state information, obtaining at least one worker of the predecessor worker manager, the obtained at least one worker managed by the worker manager; and
    updating metadata associated with the at least one worker indicating the worker manager manages the at least one worker.

2. The computer-implemented method of claim 1, wherein the computer-implemented method further comprises:

obtaining an indication from the predecessor worker manager that a particular worker managed by the predecessor worker manager with the state information is not available;

obtaining a worker from a pool of workers as a result of obtaining the indication; and adding the worker to the set of workers managed by the worker manager.

3. The computer-implemented method of claim 1, wherein determining the worker manager of the set of worker managers further comprises generating a hash of a customer identification information included in the request, the hash mapping to a portion of the consistent hash ring associated with the worker manager.

4. A system, comprising:

one or more processors; and memory that includes instructions that, as a result of being executed by the one or more processors, cause the system to:

detect a deployment associated with a first set of worker managers, each worker manager of the first set of work managers managing a set of workers to process requests;

generate a consistent hash ring, the consistent hash ring mapping the set of worker managers to hash keys;

identify a previous version of the consistent hash ring based on generating the consistent hash ring;

associate the consistent hash ring with the previous version of the consistent hash ring, the previous version of the consistent has ring associated with one or more previous sets of worker managers;

determine a worker manager of the set of worker managers associated with a request to perform an operation, based at least in part on the consistent hash ring;

determine predecessor information based at least in part on the previous version of the consistent hash ring, the predecessor information indicating a predecessor worker manager of a second set of worker managers;

provide the request and the predecessor information to the particular worker manager;

submit, as a result of a determination that there is insufficient state information to process the request, a request for state information to the predecessor worker manager;

identify a worker managed by the predecessor worker manager of the previous version of the consistent hash ring; and associate the identified worker with the particular worker manager, associating the worker with the particular worker manager comprising updating metadata associated with the identified worker to indicate that the identified worker is no longer associated with the predecessor worker manager.

5. The system of claim 4, wherein a worker of the set of workers further includes a container, the container executing a task definition to complete tasks included in the request.

6. The system of claim 4, wherein a worker of the set of workers further includes a storage instance performing storage tasks included in the request.

7. The system of claim 4, wherein a worker of the set of workers further includes a database instance used to complete tasks included in the request.

8. The system of claim 4, wherein the memory further includes instructions that cause the system to maintain a plurality of previous versions of the consistent hash ring.

9. The system of claim 4, wherein providing the predecessor information to the particular worker manager causes the particular worker manager to obtain the worker managed by the predecessor worker manager indicated in the predecessor information.

10. The system of claim 4, wherein the attribute further includes information indicating a type of the request.

11. The system of claim 4, wherein the attribute further includes identification information of a computer system that submitted the request.

12. A set of one or more non-transitory computer-readable storage media having stored thereon executable instructions that, as a result of being executed by one or more processors of a computer system, cause the computer system to:

detect a change to a set of worker managers;

generate a consistent hash ring associated with the change to the set of worker managers;

identify a previous version of the consistent hash ring based on generating the consistent hash ring;

associate the consistent hash ring with the previous version of the consistent hash ring associated with a previous set of worker managers;

obtain a request to perform a task, the set of worker managers associated with the request;

determine a predecessor worker manager of the set of worker managers associated with the request based at least in part on the previous version of the consistent hash ring associated with the previous set of worker managers;

provide the request to a worker manager of the set of worker managers based at least in part on the consistent hash ring and information indicating the predecessor worker manager;

as a result of a determination that the worker manager has insufficient state information to process the request, provide a request for state information to the predecessor worker manager;

in response to the request for state information, obtain state information associated with the predecessor worker manager;

cause the predecessor worker manager to remove the state information from storage accessible to the predecessor worker manager;

obtain a worker from the predecessor worker manager; and update metadata associated with the worker to indicate the worker manager manages the worker.

13. The set of one or more non-transitory computer-readable storage media of claim 12, wherein the instructions further comprise instructions that, as a result of being executed by the one or more processors, cause the computer system to request the state information from a worker managed by the predecessor worker manager or the set of worker managers, the state information used to perform the task included in the request.

14. The set of one or more non-transitory computer-readable storage media of claim 13, wherein the instructions further comprise instructions that, as a result of being executed by the one or more processors, cause the computer system to:

obtain an indication from the predecessor worker manager that no worker is available; and obtain a worker to process the request.

15. The set of one or more non-transitory computer-readable storage media of claim 12, wherein the instructions further comprise instructions that, as a result of being executed by the one or more processors, cause the computer system to obtain the state information from the predecessor worker manager by at least transmitting an application program interface call to the predecessor worker manager, the application program interface call generated based at least in part on the information indicating the predecessor worker manager, the state information used by the worker manager to process the request.

16. The set of one or more non-transitory computer-readable storage media of claim 12, wherein the instructions further comprise instructions that, as a result of being executed by the one or more processors, cause the computer system to provide a host for one or more containers to the worker manager based at least in part on the information indicating the predecessor worker manager, the host managed by the predecessor worker manager prior to being provided to the worker manager.

17. The set of one or more non-transitory computer-readable storage media of claim 16, wherein the instructions further comprise instructions that, as a result of being executed by the one or more processors, cause the computer system to determine the container is performing a task and providing the container to the worker manager is triggered by detecting completion of the task.

18. The set of one or more non-transitory computer-readable storage media of claim 12, wherein the instructions further comprise instructions that, as a result of being executed by the one or more processors, cause the computer system to:
 determine the worker manager has failed to respond prior to termination of an interval of time; and
 add the worker manager to a blacklist indicating worker managers not to provide requests.

* * * * *